Patented May 7, 1940

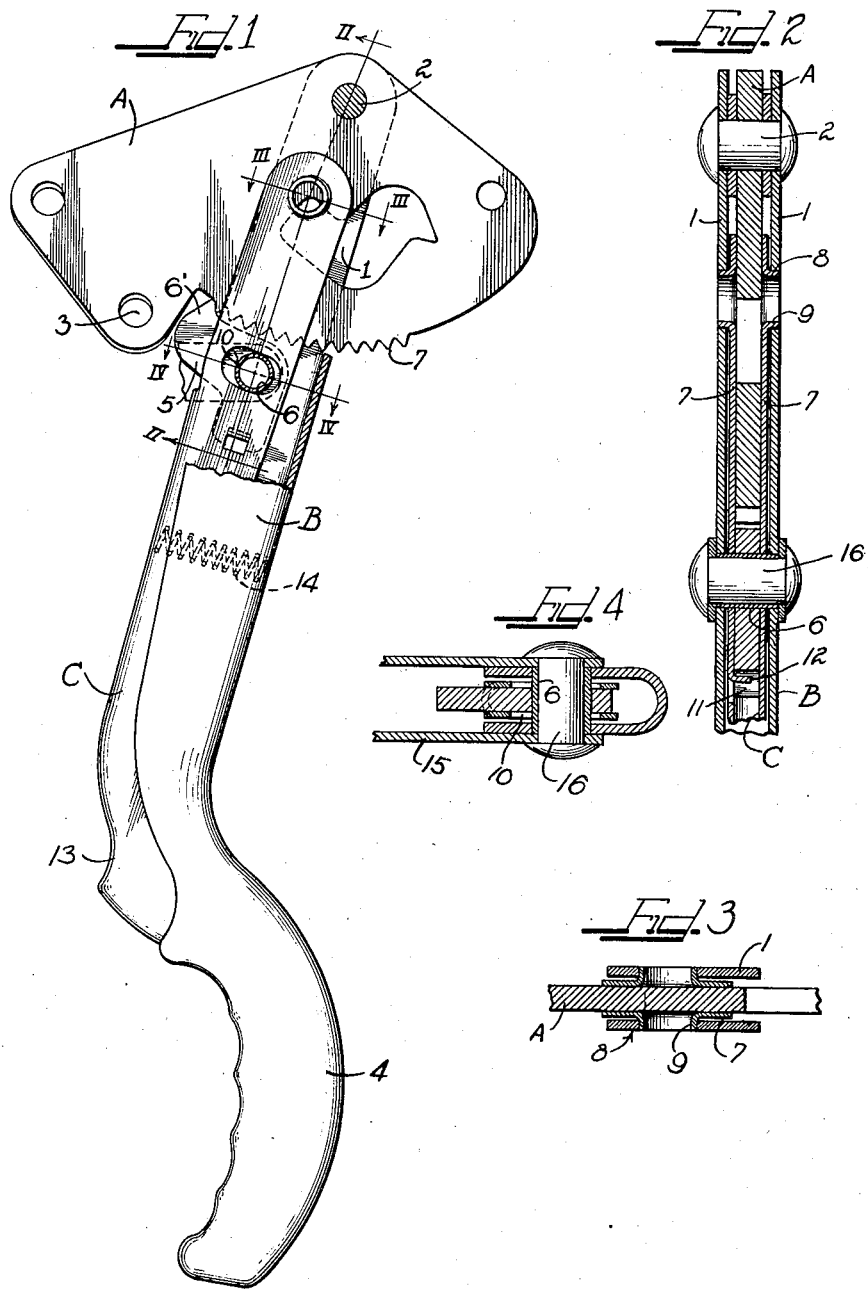

2,199,448

UNITED STATES PATENT OFFICE 2,199,448

BRAKE LEVER

Ray A. Sandberg, Waukegan, Ill., assignor to Houdaille-Hershey Corporation, Detroit, Mich., a corporation of Michigan Application August 8, 1938, Serial No. 223,574

7 Claims. (Cl. 74—537)

The present invention relates to a brake lever, and more particularly to a novel manner of pivotally connecting the clutch member release to the lever member.

Heretofore, when clutch member release parts have been pivotally connected to brake levers, the connection has been by bolts, nuts and cotter pins, or else by rivets, at the fulcrum point. This construction has proved costly in material as well as in cost of assembly.

The present invention has for an object the provision of a novel pivotal connection between a clutch release member and a brake lever member which is positive in operation and which may be less expensively made than the bolt and nut or rivet pivotal connection.

Another object of the present invention is to provide a pivotal connection between a clutch release member and a lever member in which the pivotal relationship is established by parts formed during the stamping operations in shaping the lever member and release member.

A further object of the present invention relates to a novel pivotal connection between a stamped U-shaped brake lever member and a stamped release member having a U-shaped portion arranged in lapping relationship, with protrusions on certain of the lapping parts entered in apertures on other of the lapping parts to constitute trunnions or a pivotal axis.

The above, other and further objects of the present invention will be apparent from the following description and accompanying drawing.

The accompanying drawing illustrates an embodiment of the present invention, and the views thereof are as follows:

Figure 1 is a view, partially in side elevation and partially in section, of a stamped emergency brake lever for automotive vehicles constructed in accordance with the principles of the present invention, and showing the lever in "off" position.

Figure 2 is a sectional view taken substantially in the plane indicated by the line II—II of Figure 1.

Figure 3 is a sectional view taken substantially in the plane indicated by the line III—III of Figure 1.

Figure 4 is an enlarged sectional view taken substantially in the plane indicated by the line IV—IV of Figure 1.

The drawing will now be explained.

The form of construction chosen to exemplify the present invention includes a mounting plate or bracket A of flat metal stamped to proper size and form, a lever member B formed to a U-shaped configuration in section for a major portion of its length, having spaced legs 1 at its upper end, which legs are pivoted at their extremities to the plate A by means of a suitable pivot pin 2, such as a rivet, bolt or other suitable means.

The plate A is provided with apertures or bolt holes 3 whereby it may be secured in place behind the instrument board of an automotive vehicle in position to support the brake lever B in dependent relation with its grip below the lower margin of the instrument board.

The brake lever member B is formed with a closed grip 4, of suitable shape and formation.

A pawl 5 is stamped out of the plate or bracket A to conserve stock. The pawl is formed with a tooth 6' for engaging ratchet teeth 7 formed on a margin of the plate A, the ratchet so formed and the pawl constituting clutching members for holding the lever member B in adjusted position.

The pawl 5 is pivoted to the lever member B by means of a hollow pivot or tubular member 6 passing through a suitable aperture in the pawl and suitable apertures in the side walls of the shank portion of the lever member.

A clutch releasing member C is formed as a stamping, of general U-shaped configuration in cross-section, having spaced legs 7 at its upper end which straddle the plate A and which are pivoted to the legs 1 of the lever member B.

The pivotal connection of the release member C to the lever member B is accomplished by piercing holes or apertures 8 in the legs of the lever member and by forming protrusions 9 in the legs 7 of the releasing member, entering the protrusions in the apertures 8 as trunnions, thus constituting pivotal connection of the release member and the brake lever member.

The legs 7 of the release member C are slotted at 10 to surround the tubular pivot 6 which connects the pawl 5 to the lever member B.

The pawl 5 has a notch 11 formed in it into which enters a lug pawl struck out of one of the side walls of the release member C to thus operatively connect the release member C and the pawl.

The release member C is fashioned to provide a depression or recess 13, adjacent the lower end of the release member and adjacent the upper end of the grip 4 of the lever member for engagement by the forefinger of the hand of the operator, to rock the release member C in a direction to separate the clutching members.

A spring 14 is interposed between the lever member B and the release member C operating to normally maintain the lower or trigger end of the release member C projected within the slot of the body of the lever member and thus maintain the pawl in latching engagement with the ratchet to hold the lever in adjusted position.

The brake lever B is connected to the brake mechanism in any suitable manner—for example, as by a clevis or yoke 15 pivoted to the brake lever member B by means of a rivet 16 passing through the tubular pivot 6 which connects the pawl to the lever member B.

It will be observed that the lever construction herein disclosed is one which may be manufactured at minimum cost as to materials and labor.

The attaching bracket or support A is formed as a stamping; and the lever member B, the release member C, and the pawl 5 are stampings, with the pawl being blanked out of the attaching plate A. Thus a minimum amount of metal is utilized in the manufacture of the present lever. The ratchet is formed as an integral part of the attaching plate by forming teeth 7 along the margin of the plate.

The manner of pivotally connecting the release member C to the lever member B involves machine operation and a minimum of labor to assemble.

The release member C is pivotally connected to the lever member B, when the parts are assembled, by inserting the protuberances 9 or trunnions in the apertures 8 of the legs of the brake lever member B, whereupon the lever member is applied to the bracket A with the legs astraddle the same and thereto pivoted at 2. The relationship of the parts is such that when the lever member is pivoted to the attaching mounting plate A the pivotal connection of the release member C to the brake lever member B is maintained under all conditions of operation and without any possibility whatsoever of disconnection of the parts.

As the parts are illustrated and constructed, the legs 7 of the release member C are immediately adjacent the side surfaces of the attaching bracket A—that is, the ratchet portion of the bracket—and may have slight bearing against such surfaces to eliminate rattle and to maintain lever member B from twisting with respect to the bracket A.

The tubular pivot 6 is applied to the brake lever member B to mount the pawl 5 therein prior to assembly of the pivotal connection of the release member C and the lever member B.

Inasmuch as the function performed by the release member C is to disengage one of the clutching members from the other, it may be made of lighter stock than the brake lever member B, thus affording a reduction in the cost of stock necessary for the manufacture of such a brake lever construction.

A lever constructed in accordance with the present invention is pleasing in appearance, effective in service, and is one which may be made at a minimum manufacturing cost.

The present invention has herein been described more or less precisely as to details; yet it is to be understood that the invention is not to be limited thereby, as changes may be made in the arrangement and proportion of parts, and equivalents may be substituted, without departing from the spirit and scope of the invention.

The invention is claimed as follows:

1. A brake lever construction having a stamped U-shaped lever member and a stamped U-shaped clutch release member pivoted together with walls of one member lapping the walls of the other member, characterized by provision of registering openings in the lapping walls of one of said members engaged by protruding integral portions of the lapping walls of the other member constituting their pivotal connection.

2. A brake lever construction including a lever member having spaced legs for pivotal connection to a support, cooperating clutching members for holding said lever in adjusted position, a clutch release member pivotally connected to said lever for unclutching said members, said lever legs being apertured in register, and said release member having outturned collars or extrusions entered in said leg apertures constituting the pivotal connection of said lever member and release member.

3. A brake lever construction including a lever member and a release member pivoted for jackknife action with parts of one overlapping parts of the other, the overlapping parts having registering apertures, and the lapped parts having protruding portions entered in said apertures to constitute the pivotal connection between said members.

4. An emergency brake lever construction including a lever member which is of U-shaped configuration for a major portion of its length, and a clutch release member having a U-shaped configuration for a major portion of its length, each of said members having spaced legs, the legs of said lever member being adapted for pivotal connection to a support, the legs of said members being pivoted together in spaced relation to the lever member pivot, and characterized by registering apertures in the legs of one of said members entered by extrusions formed in the legs of the other of said members.

5. An emergency brake lever construction including a lever member and a clutch release member, each of said members having spaced legs, the legs of said lever member being adapted for pivotal connection to a support, the legs of said members being pivoted together in spaced relation to the lever member pivot and characterized by registering apertures in the legs of one of said members entered by extrusions formed in the legs of the other of said members.

6. A brake lever construction including a lever member having side walls, a clutch release member having side walls, said members being assembled with their walls in lapping arrangement, the side walls of one of said members having apertures and the side walls of the other of said members having integral parts struck out of the planes of said walls and entered in the apertures of said other member for pivotally connecting said members.

7. An emergency brake lever construction including a lever member and a release member arranged for jack-knife action, one of said members having cylindrical projections struck from it and extending from both sides thereof in opposite directions, and the other of said members having entrance in its sides for receiving said projections as axles for providing pivotal connection between said members.

RAY A. SANDBERG.